J. HOFFMAN.
VARIABLE SPEED GEARING.
APPLICATION FILED MAR. 23, 1914.
1,113,629.
Patented Oct. 13, 1914.
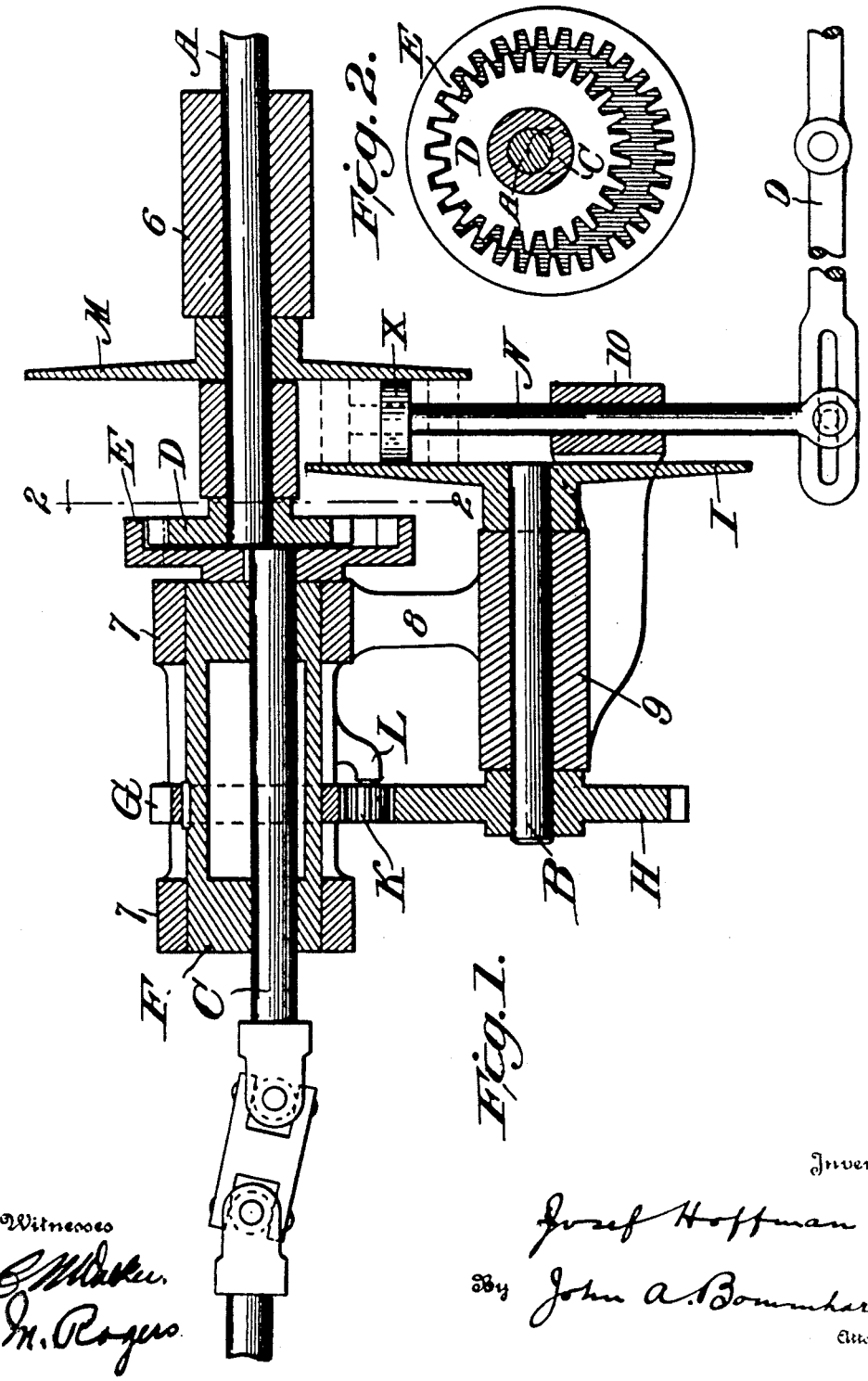

UNITED STATES PATENT OFFICE.

JOSEF HOFFMAN, OF CLEVELAND, OHIO.

VARIABLE-SPEED GEARING.

1,113,629.  Specification of Letters Patent.  Patented Oct. 13, 1914.

Application filed March 23, 1914. Serial No. 826,534.

*To all whom it may concern:*

Be it known that I, JOSEF HOFFMAN, a subject of the Empire of Austria-Hungary, residing at Cleveland in the county of Cuyahoga and State of Ohio, have invented certain new and useful Improvements in Variable-Speed Gearing, of which the following is a specification.

This invention relates to variable speed gearing, and has for its object to provide an improved gearing for varying the speed of a driven shaft with respect to a driving shaft.

The structure embodies driven and driving shafts, of which the former is eccentrically mounted with respect to the latter. The driven shaft is rotated by direct gearing from the driving shaft, and it is also mounted in a sleeve eccentric to the driving shaft so that when the sleeve is rotated the driven shaft is revolved with respect to the axis of the driving shaft, and the speed of rotation of the sleeve may be varied by a friction gear, so that the effective speed of rotation of the driven shaft is the component of the speed of rotation imparted to it by the driving shaft, as reduced by the speed of revolution imparted to it, as it rotates, by the sleeve. The driven shaft thus rotates and also revolves, and the revolution varies the transmitted speed.

The invention is illustrated in the accompanying drawings in which:—

Figure 1 is a longitudinal sectional view of the gearing. Fig. 2 is a section on the line 2—2 of Fig. 1.

Referring specifically to the drawings, the driving shaft is indicated at A and the driven shaft at C. The former is mounted in bearings 6 and carries a pinion D which meshes with an internal gear E which is fast on the end of the shaft C. Consequently the shaft A rotates the shaft C by means of the pinion D and the gear E.

The shaft C is eccentrically mounted for rotation in a sleeve F which is rotatable in bearings 7 forming a part of a frame 8. The axis of the shaft C is eccentric to that of the shaft A, and the axis of the sleeve F is eccentric to both. When the sleeve F is rotated in its bearings 7 it revolves the shaft C and causes the gear E to travel around or with respect to the gear D.

The sleeve F is driven or rotated by a pinion K mounted on a stud L attached to the frame, by means of a gear G which is fast on the sleeve F and which meshes with said pinion K. This pinion meshes with a gear H fast on a countershaft B supported in a bearing 9 on the frame, and this shaft B also carries a friction disk I which is driven by a shiftable friction wheel X from a friction disk M which is fast on the shaft A. The wheel X is mounte on a shifting rod N which works through a guide 10 on the frame and which may be shifted by a lever O operated by hand or otherwise. By shifting the whe X the speed of the shaft B and consequently of the sleeve F will be varied in an obvious manner, the speed of the sleeve being increased as the wheel X is shifted toward the shaft B and decreased by the reverse, or the shaft B may be stopped altogether by shifting the wheel X out of contact with the disk M.

When the wheel X is inactive the shaft C will be driven at a constant speed determined by the relative proportions of the gears D and E. This is the highest speed. When the wheel X is shifted to drive the shaft B, the sleeve F is turned accordingly, and its direction of rotation is the same as that of the shaft C. The shaft C will then revolve or have an orbital motion which will cause the gear E to travel around or with respect to the pinion D, and the faster the sleeve is driven the slower the relative rotation of the shaft C will be. The shaft C will thus have a combined rotation and revolution, the variable speed of the latter of which will determine the effective speed of rotation thereof. The shaft C will be connected to its work in any suitable manner, as by a system of universal joints, or a flexible shaft, (not shown).

What I claim as new is:

1. In a variable speed gearing, the combination of a driving shaft, a driver shaft, gears between said shafts, a rotary sleeve in which one of said shafts is rotatably mounted eccentric to the other shaft, and variable speed gearing between said sleeve and the last mentioned shaft.

2. In a variable speed gearing, the combination of a driving shaft, a driven shaft eccentric thereto, an internal gear on the driven shaft, a pinion on the driving shaft meshing with said gear, a rotary sleeve in which the driven shaft is eccentrically mounted for rotation therein, and variable speed gearing between the driving shaft and the sleeve, to rotate the latter and revolve the driven shaft.

3. In a variable speed gearing, the combination of a driving shaft, a driven shaft eccentric thereto, an internal gear on the driven shaft, a pinion on the driving shaft meshing with said gear, a rotary sleeve in which the driven shaft is eccentrically mounted for rotation therein, and variable speed friction gearing between the driving shaft and the sleeve, to rotate the latter and revolve the driven shaft.

4. In a variable speed gearing, the combination of a driving shaft, a pinion thereon, a driven shaft, an internal gear thereon meshing with said pinion, a rotary sleeve in which the driven shaft is rotatably mounted eccentric to the driving shaft, a counter shaft, gearing between the counter shaft and the sleeve to rotate the latter and thereby revolve the driven shaft, and variable friction gearing between the driving shaft and the counter shaft.

5. In a variable speed gearing, the combination of a driving shaft, a driven shaft eccentric thereto, direct driving means between said shafts, to rotate the latter and means to revolve the driven shaft with respect to the axis of the driving shaft, as the former rotates, to vary its effective speed of rotation.

6. In a variable speed gearing, the combination of a driving shaft, a driven shaft eccentric thereto, direct driving means between said shafts, to rotate the latter, and means driven by the driving shaft to revolve the driven shaft with respect to the axis of the driving shaft, as the former rotates, to vary its effective speed of rotation.

In testimony whereof, I do affix my signature in presence of two witnesses.

JOSEF HOFFMAN.

Witnesses:
JOHN A. BOMMHARDT,
D. C. REED.